United States Patent
Tseng et al.

[11] Patent Number: 5,230,609
[45] Date of Patent: Jul. 27, 1993

[54] AIR BRAKE SYSTEM FOR A VEHICLE

[76] Inventors: Chei-Su Tseng; Lain-Chei Tseng, both of No. 20, Lane 27, Tzu Chiang 3rd Rd., Kaohsiung, Taiwan

[21] Appl. No.: 830,602

[22] Filed: Feb. 4, 1992

[51] Int. Cl.$^5$ .............................. F04B 41/04
[52] U.S. Cl. ................... 417/237; 417/364
[58] Field of Search ............ 417/237, 364, 1 R; 123/198 F, DIG. 7

[56]  References Cited
U.S. PATENT DOCUMENTS

| | | | |
|---|---|---|---|
| 473,302 | 4/1892 | Dunn | 417/237 |
| 2,676,752 | 4/1954 | Ochel et al. | 417/237 |
| 3,365,014 | 1/1968 | Clingerman et al. | 417/237 X |
| 3,426,523 | 2/1969 | Straub | 417/237 X |
| 4,492,192 | 1/1985 | Baguelin | 123/DIG. 7 X |
| 4,631,000 | 12/1986 | Burandt | 417/237 |
| 5,105,779 | 4/1992 | Thompson | 123/198 F X |

*Primary Examiner*—Richard A. Bertsch
*Assistant Examiner*—Alfred Basichas
*Attorney, Agent, or Firm*—Biebel & French

[57] ABSTRACT

An air brake system for a vehicle including a valve disposed between a fuel tank and a fuel pump and a cylinder of an engine for switching fuel flow from the fuel pump to either the fuel tank or the cylinder, another valve coupled between the cylinder and the air tank for supplying pressurized air from the cylinder to the air tank, the other valve being closed when fuel flows into the cylinder and opened in order to introduce the pressurized air to the air tank.

14 Claims, 6 Drawing Sheets

AIR BRAKE SYSTEM FOR A VEHICLE

BACKGROUND OF THE INVENTION

1. Field of the Invention

The present invention relates to an air brake system, and more particularly to an air brake system for a vehicle.

2. Description of the Prior Art

Air brake systems are widely used for large vehicles, such as trucks and trailers, and comprise generally a compressor for generating pressurized air which is accumulated and stored in an air tank and which is supplied to the air brake system for operating the brake of the vehicle. However, the pressurized air will be exhausted soon if the brakes of the vehicle are continuously operated for a short period of time, for example, when the vehicle moves down a hill and the like. The brake system will fail if the pressurized air is not sufficient. This is dangerous. Generally, it takes a long time for the compressor to replenish the air tank, such that the vehicle should be stopped and parked in place in order to wait until the air tank is filled up again. This is inconvenient.

The present invention has arisen to mitigate and/or obviate the afore-described disadvantages of the conventional air brake systems.

SUMMARY OF THE INVENTION

The primary objective of the present invention is to provide an air brake system for a vehicle in which the pressurized air can be supplied from the engine to the air tank, and the brake system of the vehicle can be operated continuously without parking of the vehicle.

In accordance with one aspect of the invention, there is provided an air brake system for a vehicle including an air tank, a fuel tank, a fuel pump, an engine having a cylinder for generating pressurized air, a first valve means coupled between the fuel pump and the fuel tank and the cylinder of the engine for switching fuel flow from the fuel pump to either the fuel tank or the cylinder, a second valve means coupled between the cylinder and the air tank for supplying the pressurized air to the air tank, the second valve means being closed when the fuel from the fuel pump is guided to flow into the cylinder, and the pressurized air being caused to flow into the air tank when the second valve means is opened and when the fuel from the fuel pump is guided to flow into the fuel tank.

Further objectives and advantages of the present invention will become apparent from a careful reading of the detailed description provided hereinbelow, with appropriate reference to the accompanying drawings.

DETAILED DESCRIPTION OF THE PREFERRED EMBODIMENT

Figure 1:
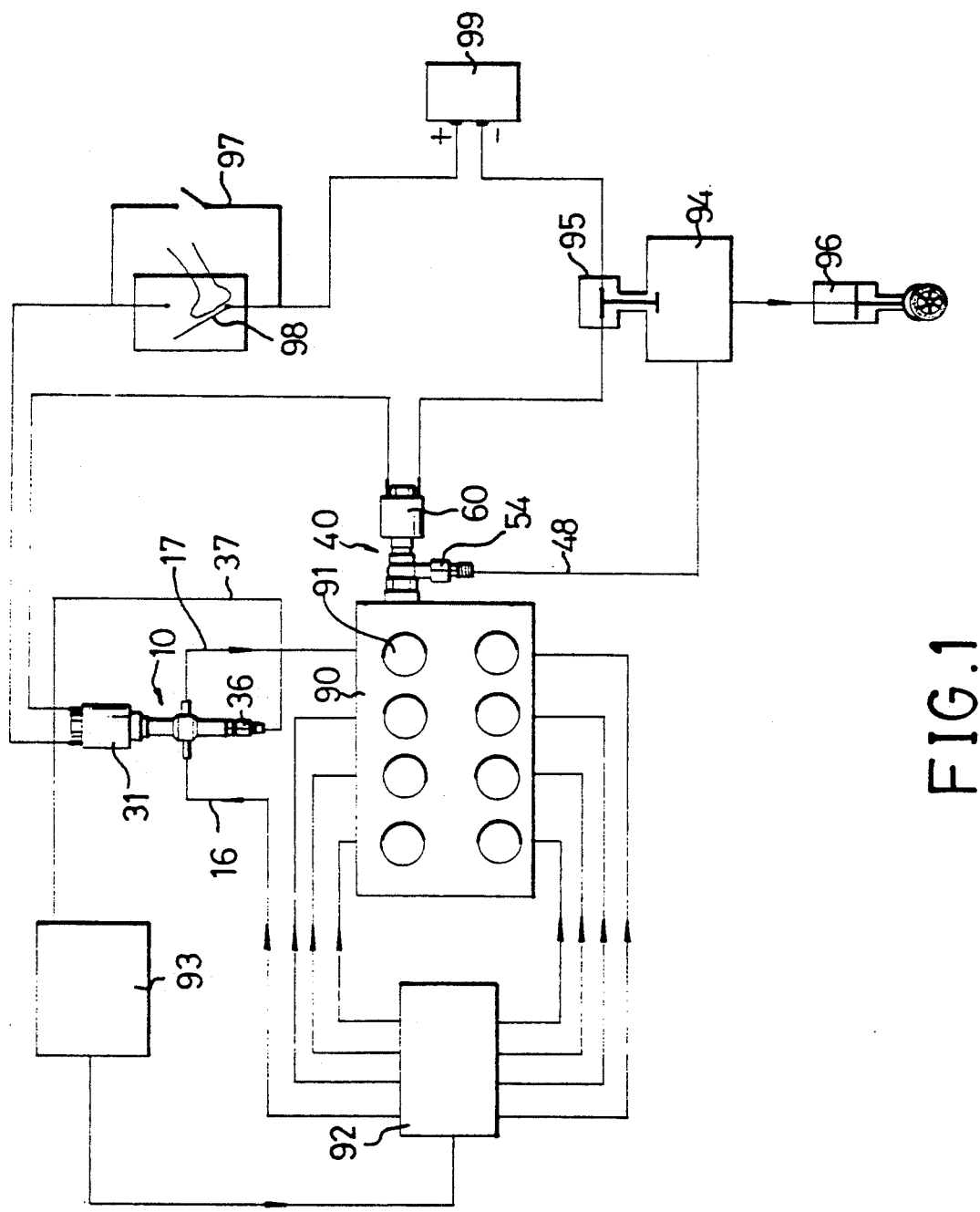
FIGS. 1 and 2 are schematic views of an air brake system in accordance with the present invention, illustrating the operation thereof.
Figure 2:
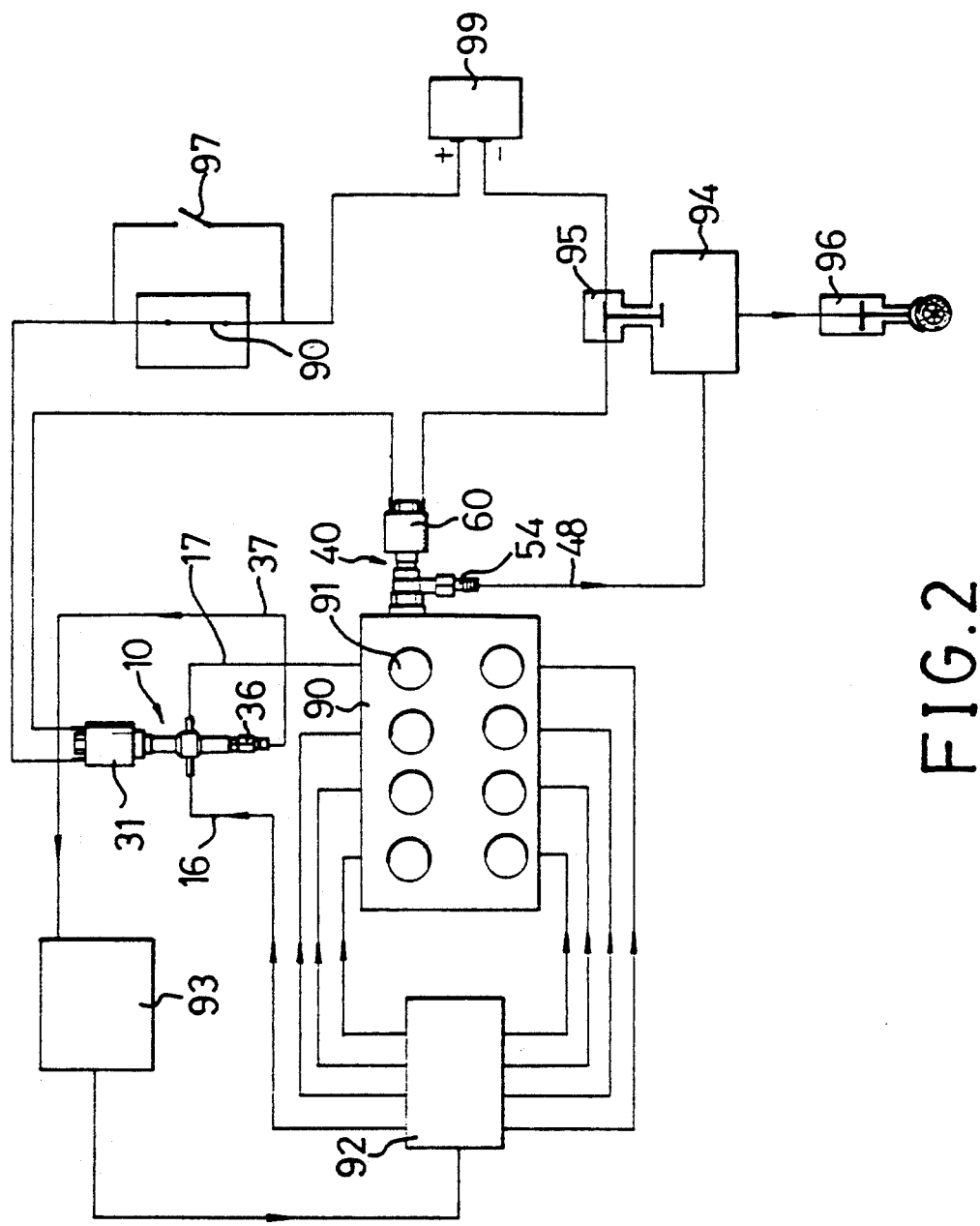

Referring to the drawings, and initially to FIGS. 1 and 2, a typical large vehicle, such as truck or trailer, comprises an engine 90, particularly an eight-cylinder Diesel engine, a fuel pump 92 for supplying fuel to each of the cylinders 41, a fuel tank 93 for storing fuel and for supplying fuel to the fuel pump 92, and an air tank 94 for storing pressurized air and for supplying pressurized air to the brake mechanism 96. The brake mechanism 96 can be controlled by a foot pedal 98 disposed in the driver's cab. The vehicle also includes a battery 99.

An air brake system in accordance with the present invention comprises generally a first valve means 10 for switching the fuel either to one cylinder 91 of the engine 90 (FIG. 1) or to the fuel tank 93 (FIG. 2); and a second valve means 40 for controlling the flowing of the pressurized air from the cylinder 91 to the air tank 94. A switch 95 is electrically coupled between the battery 99 and the second valve means 40 and is coupled to the air tank 94. The switch 95 is a safety switch and will be switched off when the pressure of the air tank 94 reaches a predetermined value such that the air tank 94 can be prevented from becoming overpressurized. A switch 97 is also electrically connected between the battery 99 and the first valve means 10 and is connected in parallel to the switch formed by the foot pedal 98 of the vehicle, which will be described in further detail hereinafter.

Figure 3:
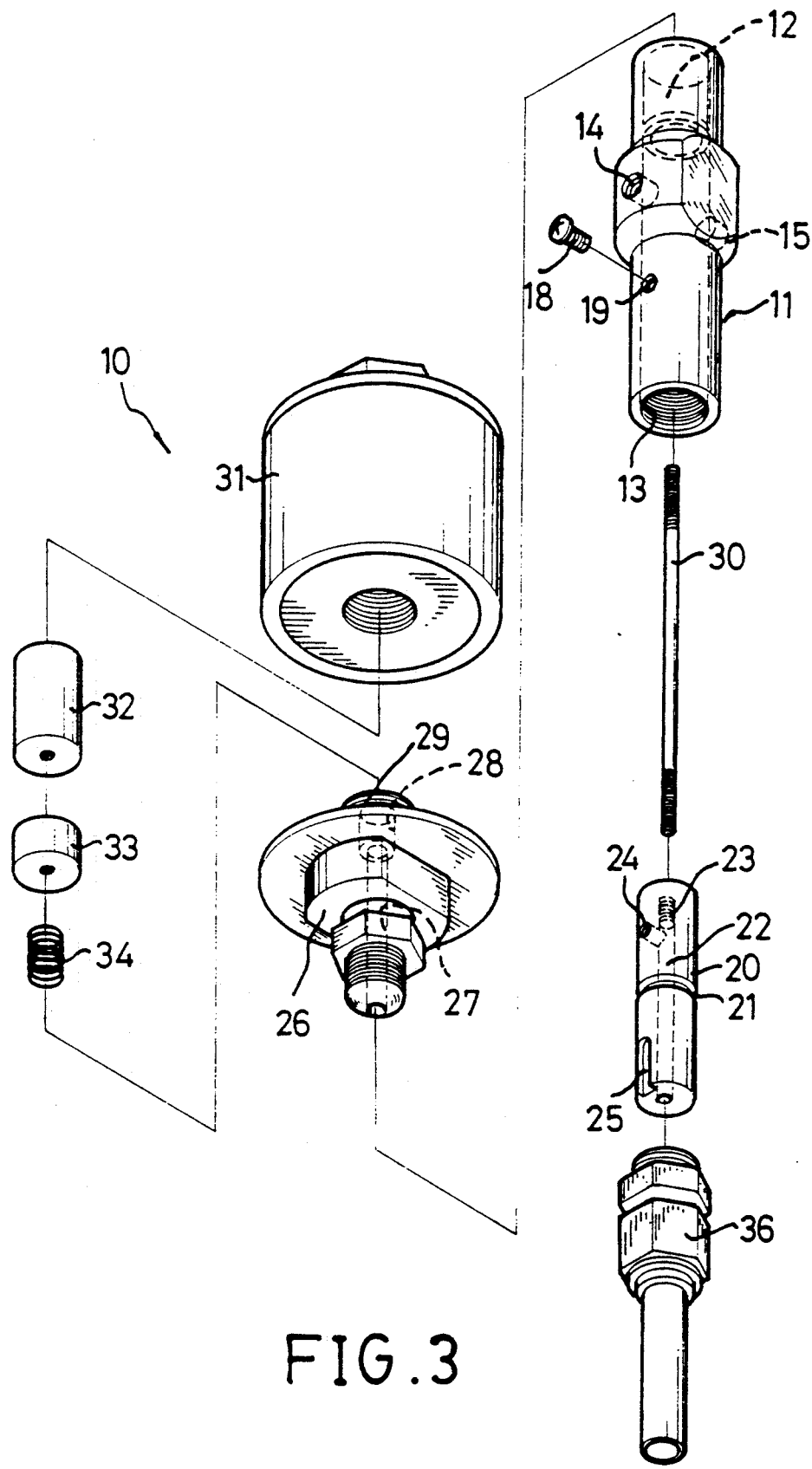
FIG. 3 is an exploded view of a valve.
Figures 4, 5:
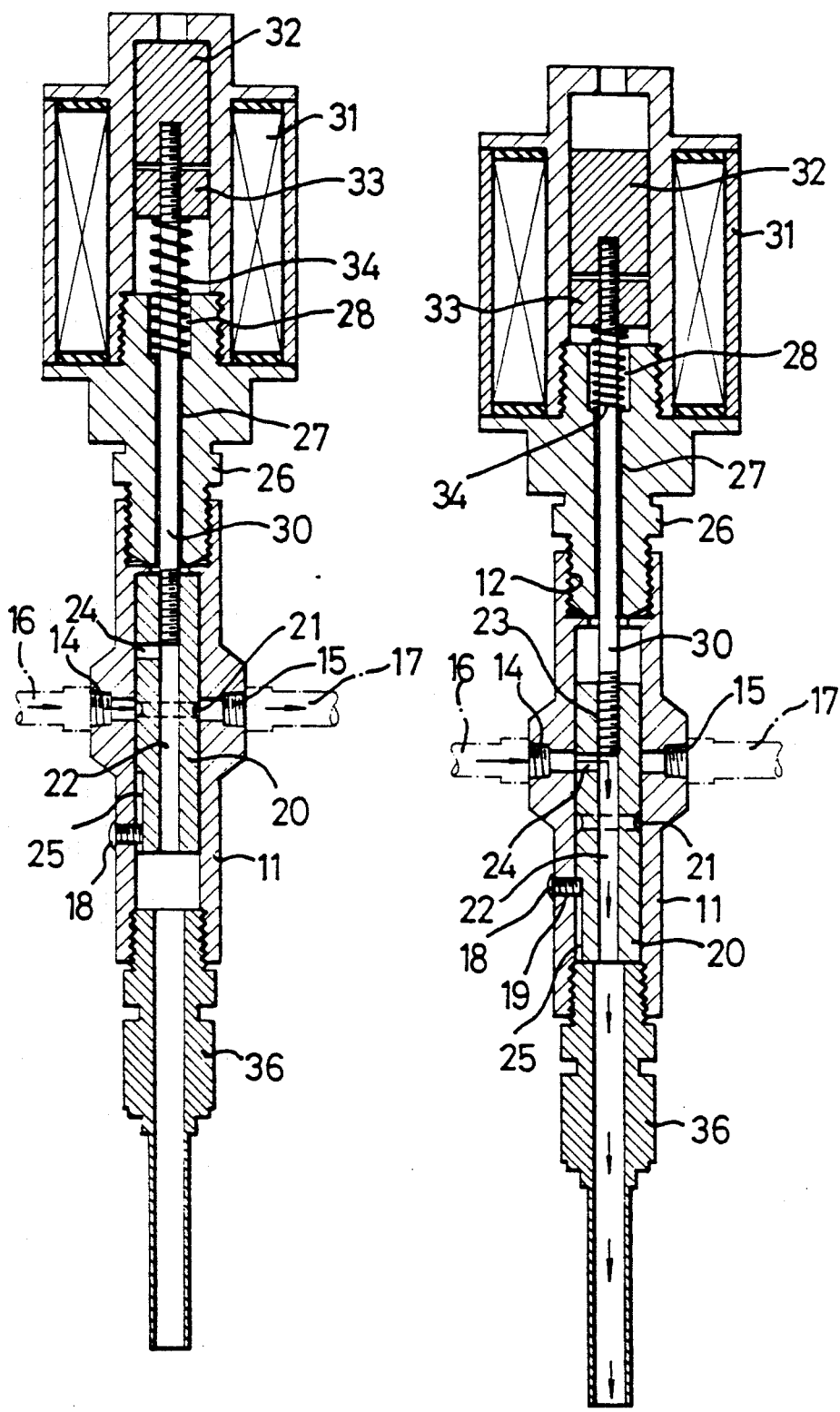
FIGS. 4 and 5 are cross sectional views of the valve as shown in FIG. 3.

Referring next to FIGS. 3 and 4, the first valve means 10 includes a tube 11 having a hollow interior and having an inner thread 12, 13 formed in the upper and lower portion respectively, two screw holes 14, 15 formed in the middle portion of the tube 11 and communicating with the hollow interior of the tube 11, a first pipe 16 having one end threaded to the screw hole 14 and having the other end connected to the fuel pump 92, a second pipe 17 having one end threaded to the screw hole 15 and having the other end connected to the cylinder 91 of the engine 90 (FIG. 1), and a screw 18 threadedly engaged in a screw hole 19 formed in the tube 11.

A guide 20 is slidably engaged in the hollow interior of the tube 11 and includes an annular groove 21 formed in the middle portion thereof and a bore 22 longitudinally formed therein, an inner thread 23 formed in the upper portion of the bore 22, a passage 24 laterally formed in the upper portion of the guide 20 and communicated with the bore 22 of the guide 20. A slot 25 is formed in the lower portion of the outer peripheral portion of the guide 20 and extends in a longitudinal direction of the guide. The screw 18 is slidably engaged in the slot 25 so that the guide 20 can be guided to slide longitudinally in the tube 11 and is prevented from rotation relative to the tube 11. A coupler 26 has a lower end threadedly engaged to the inner thread 12 of the tube 11 and includes a bore 27 longitudinally formed therein, a cavity 28 of larger diameter than that of the bore 27 is formed in the upper portion of the coupler 26. The coupler 26 includes an outer thread 29 formed on the upper portion of the outer peripheral portion thereof.

A rod 30 is slidably engaged in the bore 27 of the coupler 26 and has a lower end threadedly engaged to the inner thread 23 of the guide 20 so that the rod 30 and the guide 20 move in concert. A solenoid 31 is threadedly engaged on the outer thread 29 of the coupler 26 and includes a core 32 and a stub 33 slidably engaged therein. The upper end of the rod 30 is threadedly engaged through the stub 33 an is threaded to the core 32 so that the guide 20 moves in concert with the core 32. A spring 34 is disposed in the cavity 28 of the coupler 26 for biasing the core 32 and the stub 33 upward, as shown in FIG. 4. The stub 33 is movable longitudinally along the rod 30 so that the resilient force of the spring 34 applied to the stub 33 can be adjusted. A connector 36 is threaded to the inner thread 13 of the tube 11 and is connected to the fuel tank 93 by a pipe 37, best shown in FIGS. 1 and 2.

In operation, as shown in FIG. 4, the pipes 16, 17 are in communication with each other by the annular groove 21 of the guide 20 when the core 32 and stub 33 are biased upward by the spring 34, such that the fuel from the fuel pump 92 can be guided to flow to the cylinder 91 of the engine 90, best shown in FIG. 1, and such that the engine 90 can be operated as normal. However, as shown in FIG. 5, the guide 20 and the core 32 are caused to move downward when the solenoid 31 is activated, such that the pipe 16 is in communication with the passage 24 of the guide 20 and such that the fuel from the fuel pump 92 can be guided to flow to the fuel tank 93 via the connector 36 and the pipe 37, best shown in FIG. 2. At this moment, no fuel is supplied into the cylinder 91 such that no explosion is generated within the cylinder 91, pressurized air can thus be generated by the reciprocating actions of the piston (not shown) of the cylinder 91.

Figure 6:
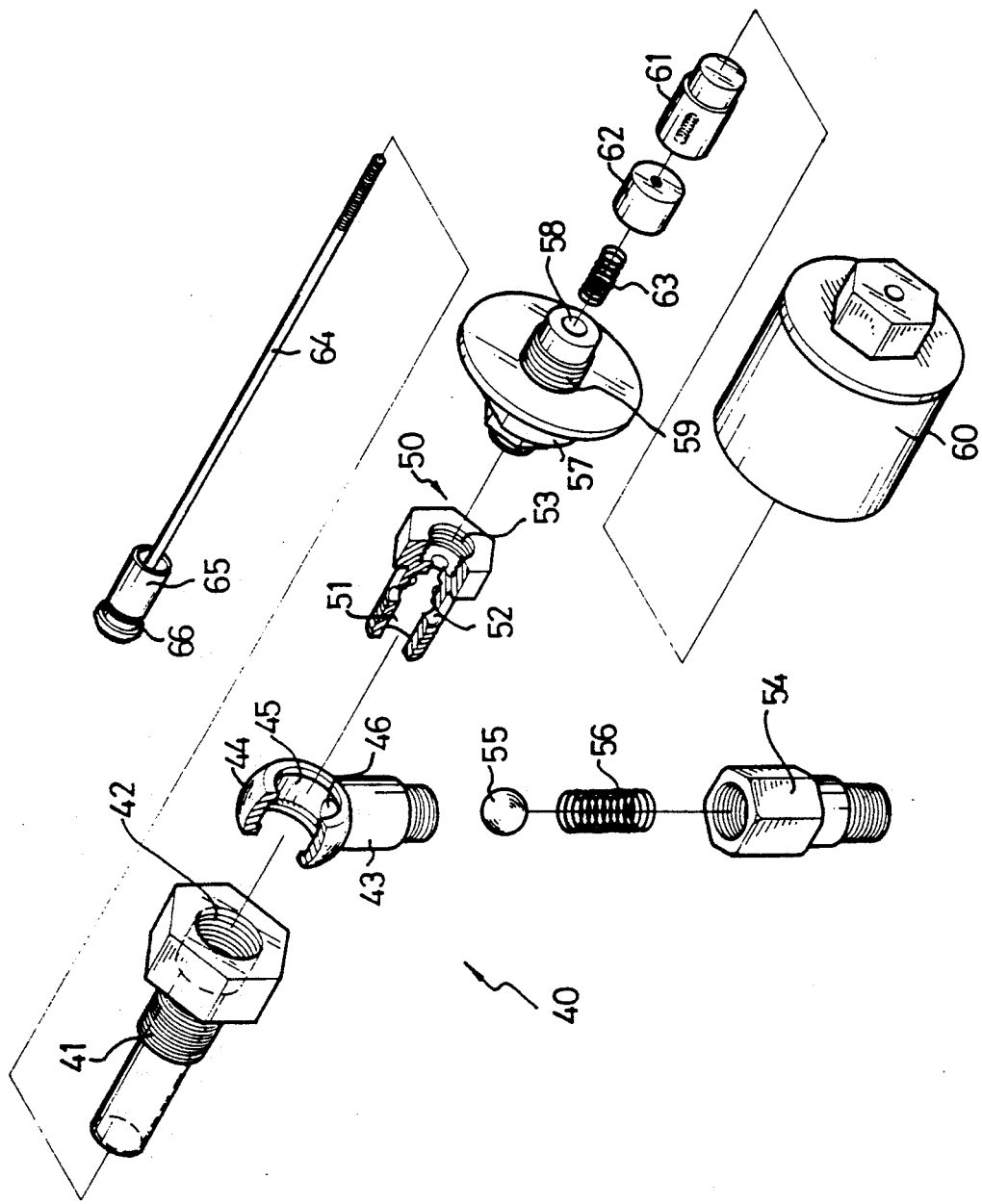
FIG. 6 is an exploded view of another valve.
Figure 7:
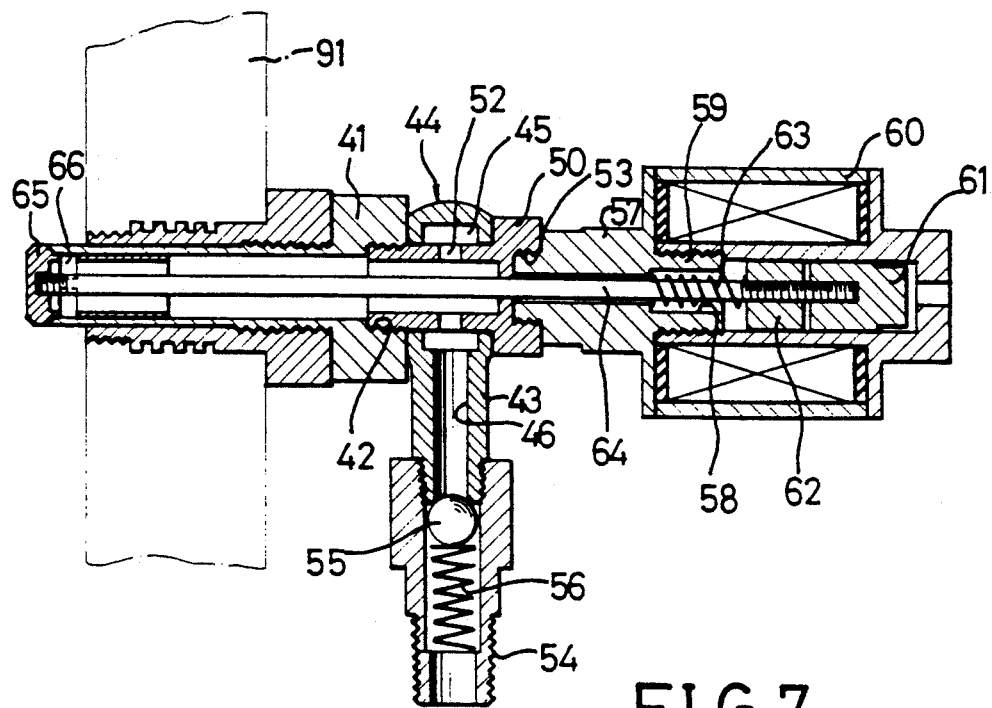
FIGS. 7 and 8 are cross sectional views of the valve as shown in FIG. 6.

Referring next to FIGS. 6 and 7, the second valve means 40 includes a connector 41 threadedly engaged to the cylinder 91 of the engine 90 and extended into the cylinder 91 and having an inner thread 42 formed therein, a member 43 having a ring 44 formed integral thereon and having a bore 46 formed therein, the ring 44 including an annular recess 45 formed therein and communicated with the bore 46 of the member 43, and a bolt 50 having one end passing through the ring 44 and threadedly engaged to the inner thread 42 of the connector 41 so that the ring 44 and the member 43 can be fixed in place. The bolt 50 includes a bore 51 longitudinally formed therein, at least one aperture 52 laterally formed therein and in communication with the bore 51, and an inner thread 53 formed in the other end thereof. The aperture 52 connects the bore 51 of the bolt 50 with the annular recess 45 of the ring 44. A check valve 54 is threaded to the lower end of the member 43 and includes a ball 55 and a spring 56 disposed therein, the ball 55 is biased by the spring 56 to close the lower end of the member 43. The check valve 54 is coupled to the air tank 94 by a pipe 48 (FIGS. 1 and 2). A coupler 57 has one end threadedly engaged to the inner thread 53 of the bolt 50 and includes a cavity 58 formed in the other end and an outer thread 59 formed on the outer peripheral portion of the other end thereof.

A solenoid 60 is threaded to the outer thread 59 of the coupler 57 and includes a core 61 and a stub 62 slidably engaged therein, a spring 63 is disposed in the cavity 58 of the coupler 57 for biasing the stub 62 and the core 61 away from the coupler 57. A rod 64 has one end threaded through the stub 62 and threadedly engaged with the core 61 of the solenoid 60 so that the rod 64 and the core 61 move in concert. The stub 62 is movable relative to the rod 64 so as to adjust the resilient force and the compression of the spring 63. The rod 64 further includes a plug 65 formed on the other end thereof and extended within the cylinder 91. The plug 65 includes an orifice 66 formed therein. The plug 65 can be caused to close the connector 41 when the rod 64 and the stub 62 are biased by the spring 63 to move away from the coupler 57.

Figure 8:
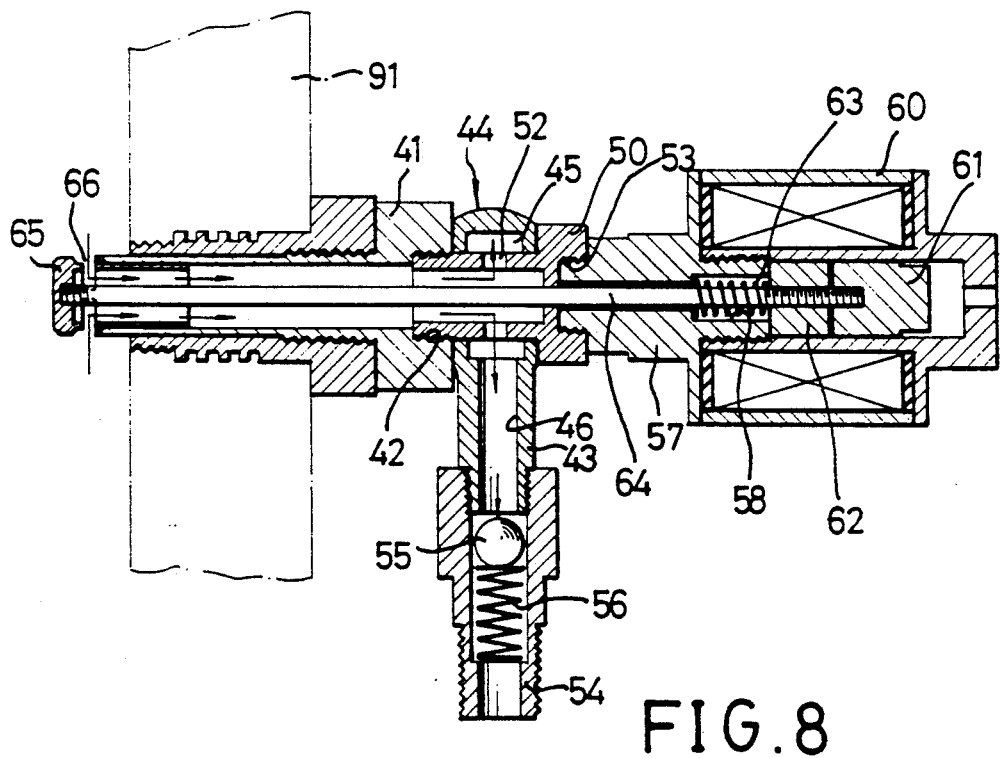

In operation, as shown in FIG. 7, the connector 41 is closed by the plug 65 when the stub 62 and the rod 64 are biased away from the coupler 57, such that the cylinder 91 is enclosed. However, as shown in FIG. 8, the plug 65 is caused to move inwards of the cylinder 91 when the solenoid 60 is activated, such that the pressurized air generated in the cylinder 91 may flow into the connector 41 via the orifice 66, and may flow into the air tank 94 via the check valve 54 and the pipe 48, as shown in FIG. 2. The pressurized air is prevented from flowing backwards into the cylinder 91 by the check valve 54.

Referring again to FIG. 1, the solenoids 31 and 60 are deactivated when the foot pedal 98 is depressed by the driver, at this moment, the pipes 16, 17 are in communication with each other such that fuel is supplied to the cylinder 91 by the fuel pump 92 and such that cylinder 91 can be operated as other cylinders do. The connector 41 is closed by the plug 65 such that the cylinder 91 is closed. However, as shown in FIG. 2, when the foot pedal 98 is not depressed, the solenoids 31 and 60 are activated such that the fuel from the pipe 16 is guided to flow into the fuel tank 93 via the pipe 37 such that no fuel is supplied into the cylinder 91 and such that no explosion will be generated within the cylinder 91 and such that pressurized air will be generated by the cylinder 91. At this moment, the plug 65 is caused to move into the cylinder 91 such that the pressurized air can flow into the air tank 94. The solenoids 31, 60 will be deactivated when the pressure within the air tank 94 reaches a predetermined value and when the safety switch 95 is switched off.

It is to be noted that, when the foot pedal 98 is depressed by the driver and when it is required to fill the air tank 94, the driver may activate solenoids 31,60 by manually placing switch 97 in the ON position.

Accordingly, the air brake system in accordance with the present invention includes an air tank 94 into which pressurized air can be supplied from the cylinder 91. The pressurized air may be supplied to the air tank 94 during movement of the vehicle by merely switching switch 97 to the ON position. The vehicle thus need not to be stopped in order to fill the air tank 94. The cylinder 91 is able to generate pressure at a rapid rate for quickly pressurizing air tank 94.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. An air brake system for a vehicle comprising an air tank, a fuel tank, a fuel pump, an engine including a cylinder for generating pressurized air, a first valve means coupled between said fuel pump and said fuel tank and said cylinder of said engine for switching fuel flow from said fuel pump to either said fuel tank or said cylinder, said first valve means comprising a tube including a middle portion having a first pipe coupled to said fuel pump and having a second pipe coupled to said cylinder, said tube including a first end coupled to said fuel tank, a solenoid coupled to a second end of said tube and including a core slidably engaged therein, a guide slidably engaged in said tube and including an annular groove formed in an outer peripheral portion thereof and a bore longitudinally formed therein, a passage laterally formed in said guide and in communication with said bore of said guide, and a rod coupled between said guide and said core of said solenoid, said first pipe and said second pipe being connected with each other by said annular groove of said guide when said solenoid is deactivated such that said fuel from said fuel pump is guided to flow into said cylinder, and said first pipe being in communication with said bore of said guide via said passage when said solenoid is activated such that said fuel from said fuel pump is guided to flow into said fuel tank, a second valve means coupled between said cylinder and said air tank for controlling said pressurized air from said cylinder to said air tank, said second valve means closed when said fuel from said fuel pump is guided to flow into said cylinder, and said pressurized air being caused to flow into said air tank when said second valve means is opened and when said fuel from said fuel pump is guided to flow into said fuel tank.

2. An air brake system according to claim 1, wherein said tube includes a screw threadedly engaged thereto, said guide includes a slot longitudinally formed in said outer peripheral portion of said guide, said screw is slidably engaged in said slot such that said guide is prevented from rotating relative to said tube.

3. An air brake system according to claim 1, wherein said solenoid further includes a stub slidably engaged therein and threadedly engaged with said rod such that said stub is movable along said rod, and means for biasing said stub away from said tube when said solenoid is deactivated.

4. An air brake system according to claim 3 further comprising a coupler coupled between said solenoid and said tube, said coupler including a cavity formed in one end thereof close to said solenoid for accommodating said means for biasing said stub away from said tube.

5. An air brake system for a vehicle comprising an air tank, a fuel tank, a fuel pump, an engine including a cylinder for generating pressurized air ,a first valve means coupled between said fuel pump and said fuel tank and said cylinder of said engine for switching fuel flow from said fuel pump to either said fuel tank or said cylinder, a second valve means coupled between said cylinder and said air tank for controlling said pressurized air from said cylinder to said air tank, said second valve means comprising a connector threadedly engaged to said cylinder, a member including a first bore formed therein and a ring formed integral on a first end thereof and a check valve coupled to said air tank, said ring including an annular recess formed therein and in communication with said first bore of said member, a bolt passing through said ring and coupling said ring to said connector, said bolt including a second bore longitudinally formed therein and at least one aperture laterally formed therein and in communication with said annular recess of said ring, a solenoid coupled to said bolt and including a core slidably engaged therein, said core being caused to move toward bolt when said solenoid is activated, and a rod including a first end coupled to said core of said solenoid and a second end having a plug provided thereon, said plug being caused to close said connector when said solenoid is deactivated, and said plug being opened when said solenoid is activated such that pressurized air generated by said cylinder is guided to flow into said air tank via said check valve, said second valve means closed when said fuel from said fuel pump is guided to flow into said cylinder, and said pressurized air being caused to flow into said air tank when said second valve means is opened and when said fuel from said fuel pump is guided to flow into said fuel tank.

6. An air brake system according to claim 5, wherein said solenoid further includes a stub slidably engaged therein and threadedly engaged with said rod such that said stub is movable along said rod, and means for biasing said stub away from said bolt when said solenoid is deactivated.

7. An air brake system according to claim 6 further comprising a coupler coupled between said solenoid and said bolt, said coupler including a cavity formed in one end thereof close to said solenoid for accommodating said means for biasing said stub away from said bolt.

8. An air brake system for a vehicle comprising an air tank, a battery, a fuel tank, a fuel pump, an engine including a cylinder for generating pressurized air, a first valve means coupled between said fuel pump and said fuel tank and said cylinder of said engine for switching fuel flow from said fuel pump to either said fuel tank or said cylinder, a switch electrically coupled between said battery and said first valve means, said first valve means comprising a tube including a middle portion having a first pipe coupled to said fuel pump and having a second pipe coupled to said cylinder, said tube including a first end coupled to said fuel tank, a solenoid coupled to a second end of said tube and including a core slidably engaged therein, a guide slidably engaged in said tube and including an annular groove formed in an outer peripheral portion thereof and a bore longitudinally formed therein, a passage laterally formed in said guide and in communication with said bore of said guide, and a rod coupled between said guide and said core of said solenoid, said first pipe and said second pipe being connected with each other by said annular groove of said guide when said solenoid is deactivated such that said fuel from said fuel pump is guided to flow into said cylinder, and said first pipe being in communication with said bore of said guide via said passage when said solenoid is activated such that said fuel from said fuel pump is guided to flow into said fuel tank, a second valve means electrically coupled between said first valve means and said battery, said second valve means disposed between said cylinder and said air tank for controlling said pressurized air from said cylinder to said air tank, said second valve means closed when said fuel from said fuel pump is guided to flow into said cylinder, and said pressurized air being caused to flow into said air tank when said second valve means is opened and when said fuel from said fuel pump is guided to flow into said fuel tank.

9. An air brake system according to claim 8, wherein said tube includes a screw threadedly engaged thereto, said guide includes a slot longitudinally formed in said outer peripheral portion of said guide, said screw is slidably engaged in said slot such that said guide is prevented from rotating relative to said tube.

10. An air brake system according to claim 8, wherein said solenoid further includes a stub slidably engaged therein and threadedly engaged with said rod such that said stub is movable along said rod, and means for biasing said stub away from said tube when said solenoid is deactivated.

11. An air brake system according to claim 10 further comprising a coupler coupled between said solenoid and said tube, said coupler including a cavity formed in one end thereof close to said solenoid for accommodating said means for biasing said stub away from said tube.

12. An air brake system for a vehicle comprising an air tank, a battery, a fuel tank, a fuel pump, an engine including a cylinder for generating pressurized air, a first valve means coupled between said fuel pump and said fuel tank and said cylinder of said engine for switching fuel flow from said fuel pump to either said fuel tank or said cylinder, a switch electrically coupled between said battery and said first valve means, a second valve means electrically coupled between said first valve means and said battery, said second valve means disposed between said cylinder and said air tank for controlling said pressurized air from said cylinder to said air tank, said second valve means closed when said fuel from said fuel pump is guided to flow into said cylinder, and said pressurized air being caused to flow into said air tank when said second valve means is opened and when said fuel from said fuel pump is guided to flow into said fuel tank, said second valve means comprising a connector threadedly engaged to said cylinder, a member including a first bore formed therein and a ring formed integral on a first end thereof and a check valve coupled to said air tank, said ring including an annular recess formed therein and in communication with said first bore of said member, a bolt passing through said ring and coupling said ring to said connector, said bolt including a second bore longitudinally formed therein and at least one aperture laterally formed therein and in communication with said annular recess of said ring, a solenoid coupled to said bolt and including a core slidably engaged therein, said core being caused to move toward bolt when said solenoid is activated, and a rod including a first end coupled to said core of said solenoid and a second end having a plug provided thereon, said plug being caused to close said connector when said solenoid is deactivated, and said plug being opened when said solenoid is activated such that pressurized air generated by said cylinder is guided to flow into said air tank via said check valve.

13. An air brake system according to claim 12, wherein said solenoid further includes a stub slidably engaged therein and threadedly engaged with said rod such that said stub is movable along said rod, and means for biasing said stub away from said bolt when said solenoid is deactivated.

14. An air brake system according to claim 13 further comprising a coupler coupled between said solenoid and said bolt, said coupler including a cavity formed in one end thereof close to said solenoid for accommodating said means for biasing said stub away from said bolt.

* * * * *